(12) United States Patent
Gauthier et al.

(10) Patent No.: US 10,584,823 B2
(45) Date of Patent: Mar. 10, 2020

(54) CHLORINE-RESISTANT POLYETHYLENE COMPOUND AND ARTICLES MADE THEREFROM

(71) Applicant: Fina Technology, Inc., Houston, TX (US)

(72) Inventors: William J Gauthier, Houston, TX (US); Crystal Bryson, Baytown, TX (US); Diana Nash, Houston, TX (US); Lu Ann Kelly, Friendswood, TX (US); Jason Clark, Houston, TX (US); Ruby Curtis, League City, TX (US); Toby Stevens, League City, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 37 days.

(21) Appl. No.: 15/315,744

(22) PCT Filed: Jun. 10, 2015

(86) PCT No.: PCT/US2015/035118
§ 371 (c)(1),
(2) Date: Dec. 2, 2016

(87) PCT Pub. No.: WO2015/191721
PCT Pub. Date: Dec. 17, 2015

(65) Prior Publication Data
US 2017/0089503 A1    Mar. 30, 2017

Related U.S. Application Data

(60) Provisional application No. 62/010,640, filed on Jun. 11, 2014.

(51) Int. Cl.
| | |
|---|---|
| *F16L 58/00* | (2006.01) |
| *F16L 9/12* | (2006.01) |
| *C08K 5/3435* | (2006.01) |
| *C08K 5/38* | (2006.01) |
| *C08F 210/16* | (2006.01) |
| *C08K 5/47* | (2006.01) |
| *C08K 5/3472* | (2006.01) |
| *C08K 5/134* | (2006.01) |
| *C08J 3/20* | (2006.01) |
| *C08K 5/105* | (2006.01) |
| *F16L 9/127* | (2006.01) |
| *C08F 4/6592* | (2006.01) |
| *C08F 4/659* | (2006.01) |

(52) U.S. Cl.
CPC ............ *F16L 58/00* (2013.01); *C08F 210/16* (2013.01); *C08J 3/203* (2013.01); *C08K 5/105* (2013.01); *C08K 5/1345* (2013.01); *C08K 5/3435* (2013.01); *C08K 5/3472* (2013.01); *C08K 5/38* (2013.01); *C08K 5/47* (2013.01); *F16L 9/12* (2013.01); *F16L 9/127* (2013.01); *C08F 4/65912* (2013.01); *C08F 4/65927* (2013.01); *C08J 2323/06* (2013.01)

(58) Field of Classification Search
CPC ...... C08K 5/3435; C08K 5/47; C08K 5/3472; C08L 23/04
See application file for complete search history.

(56) References Cited

U.S. PATENT DOCUMENTS

| | | | |
|---|---|---|---|
| 4,271,060 A | 6/1981 | Hubby | |
| 4,543,399 A | 9/1985 | Jenkins, III et al. | |
| 4,588,790 A | 5/1986 | Jenkins, III et al. | |
| 4,863,633 A * | 9/1989 | Colborn | C11D 3/3956 252/186.35 |
| 5,001,205 A | 3/1991 | Hoel | |
| 5,028,670 A | 7/1991 | Chinh et al. | |
| 5,236,998 A | 8/1993 | Lundeen et al. | |
| 5,317,036 A | 5/1994 | Brady, III et al. | |
| 5,352,749 A | 10/1994 | DeChellis et al. | |
| 5,405,922 A | 4/1995 | DeChellis et al. | |

(Continued)

FOREIGN PATENT DOCUMENTS

| | | |
|---|---|---|
| EP | 2053084 A1 | 4/2009 |
| EP | 2551294 A1 | 1/2013 |
| RU | 2006123558 A | 1/2008 |

OTHER PUBLICATIONS

International Search Report issued in PCT/US15/35118, dated Sep. 2, 2015, 2 pages.

(Continued)

*Primary Examiner* — Mark S Kaucher
(74) *Attorney, Agent, or Firm* — Albert Shung

(57) ABSTRACT

A method includes transporting water containing chlorine dioxide, chlorine, chloramines, or hypochlorites through a pipe. The method includes forming a polyethylene resin using a catalyst, mixing the polyethylene resin with an antioxidant, wherein the antioxidant is a thioester, a hindered amine light stabilizer or 1,3,5-trimethyl-2,4,6-tris (3,5-di-tert-butyl-4-hydroxybenzyl) benzene to form a resin/antioxidant mixture, extruding pipe from the resin/antioxidant mixture, and flowing water containing chlorine dioxide, chlorine, chloramines, or hypochlorites through the pipe. An extruded article is adapted for use in containment and/or transport of water that contains chlorine dioxide, chlorine, chloramines, or hypochlorites. The extruded article includes a polyethylene resin and an antioxidant. The antioxidant is a thioester, a hindered amine light stabilizer or 1,3,5-trimethyl-2,4,6-tris (3,5-di-tert-butyl-4-hydroxybenzyl) benzene.

2 Claims, 4 Drawing Sheets

(56) References Cited

U.S. PATENT DOCUMENTS

| | | | |
|---|---|---|---|
| 5,436,304 A | 7/1995 | Griffin et al. | |
| 5,456,471 A | 10/1995 | MacDonald | |
| 5,462,999 A | 10/1995 | Griffin et al. | |
| 5,525,678 A | 6/1996 | Mink et al. | |
| 5,589,555 A | 10/1996 | Zboril et al. | |
| 5,616,661 A | 4/1997 | Eisinger et al. | |
| 5,627,242 A | 5/1997 | Jacobsen et al. | |
| 5,665,818 A | 9/1997 | Tilston et al. | |
| 5,668,228 A | 9/1997 | Chinh et al. | |
| 5,677,375 A | 10/1997 | Rifi et al. | |
| 6,147,173 A | 11/2000 | Holtcamp | |
| 6,174,971 B1 | 1/2001 | Chen et al. | |
| 6,180,735 B1 | 1/2001 | Wenzel | |
| 6,207,606 B1 | 3/2001 | Lue et al. | |
| 6,211,105 B1 | 4/2001 | Holtcamp | |
| 6,242,545 B1 | 6/2001 | Jejelowo et al. | |
| 6,245,705 B1 | 6/2001 | Kissin | |
| 6,245,868 B1 | 6/2001 | Agapiou et al. | |
| 6,248,845 B1 | 6/2001 | Loveday et al. | |
| 6,271,323 B1 | 8/2001 | Loveday et al. | |
| 6,274,684 B1 | 8/2001 | Loveday et al. | |
| 6,300,436 B1 | 10/2001 | Agapiou et al. | |
| 6,339,134 B1 | 1/2002 | Crowther et al. | |
| 6,340,730 B1 | 1/2002 | Murray et al. | |
| 6,346,586 B1 | 2/2002 | Agapiou et al. | |
| 6,359,072 B1 | 3/2002 | Whaley | |
| 6,380,328 B1 | 4/2002 | McConville et al. | |
| 6,420,580 B1 | 7/2002 | Holtcamp et al. | |
| 6,734,134 B1 | 5/2004 | Gray et al. | |
| 7,473,664 B2 | 1/2009 | Vizzini et al. | |
| 8,110,644 B2 | 2/2012 | Coffy et al. | |
| 8,459,283 B2 | 6/2013 | Belloir et al. | |
| 8,528,580 B2 | 9/2013 | Belloir et al. | |
| 8,627,840 B2 | 1/2014 | Belloir et al. | |
| 2003/0073768 A1* | 4/2003 | Koch | C08K 5/005 524/323 |
| 2005/0250889 A1* | 11/2005 | Malik | C08K 5/13 524/287 |
| 2005/0272891 A1* | 12/2005 | Fouarge | B01J 8/0035 526/64 |
| 2007/0184227 A1* | 8/2007 | Steffl | C08K 5/13 428/36.9 |
| 2008/0161516 A1* | 7/2008 | Gundert | C08F 10/00 526/154 |
| 2009/0298978 A1* | 12/2009 | Rotzinger | C08K 5/17 524/130 |
| 2010/0003439 A1 | 1/2010 | Michie, Jr. et al. | |
| 2010/0267909 A1* | 10/2010 | Coffy | C08F 10/00 526/151 |
| 2010/0317761 A1* | 12/2010 | Nien | E06B 9/266 521/182 |
| 2011/0259464 A1* | 10/2011 | Lacroix | C08F 255/02 138/177 |
| 2011/0263802 A1 | 10/2011 | Zhang et al. | |
| 2011/0288216 A1* | 11/2011 | Ayabe | C08K 5/20 524/222 |
| 2012/0000534 A1* | 1/2012 | Belloir | C08L 23/04 137/1 |
| 2013/0165590 A1* | 6/2013 | McLeod | C08L 23/06 525/240 |

OTHER PUBLICATIONS

Ferdinand et al., "ansa-Metallocene derivatives: VII*. Synthesis and crystal structure of a chiral ansa-zirconocene derivative with ethylene-bridged tetrahydroindenyl ligands", J. Organomet. Chem. 288., 63-67 (1985).

Kirk-Othmer, Encyclopedia of Chemical Technology, vol. 17, 4th Edition, pp. 735-737 (1996).

Office Action issued in Eurasian Application No. 201790002 dated Mar. 26, 2018, 5 pages.

\* cited by examiner

CHLORINE-RESISTANT POLYETHYLENE COMPOUND AND ARTICLES MADE THEREFROM

CROSS-REFERENCE TO RELATED APPLICATIONS

This application is a national phase entry of PCT International Application No. PCT/US2015/035118, filed Jun. 10, 2015, which claims the benefit of U.S. Provisional Application No. 62/010,640, filed Jun. 11, 2014, which are incorporated herein by reference in their entireties for all purposes.

FIELD

This disclosure generally relates to the preparation of polyethylene resins suitable for transporting or holding cold and/or hot water containing chlorinated compounds.

BACKGROUND

The service life of polyethylene pipe and other articles in potable water applications is reduced by the presence of disinfectants used to ensure the security of a water supply. Disinfectants such as chlorine dioxide, chlorine, chloramines, hypochlorites and such form oxidizing species in water that may react with additives and oxidize the surface layer of the polyethylene articles, ultimately leading to premature failure via crack formation. The pH of the water and elevated temperature may also contribute to accelerated degradation and reduce the practical lifetime of the pipe and other articles.

SUMMARY

A method of transporting water containing chlorine dioxide, chlorine, chloramines, or hypochlorites through a pipe is described. The method includes forming a polyethylene resin using a catalyst, mixing the polyethylene resin with an antioxidant, wherein the antioxidant is a thioester, a hindered amine light stabilizer or 1,3,5-trimethyl-2,4,6-tris (3,5-di-tert-butyl-4-hydroxybenzyl) benzene to form a resin/antioxidant mixture, extruding pipe from the resin/antioxidant mixture, and flowing water containing chlorine dioxide, chlorine, chloramines, or hypochlorites through the pipe.

An extruded article is described. The extruded article is adapted for use in containment and/or transport of water that contains chlorine dioxide, chlorine, chloramines, or hypochlorites. The extruded article includes a polyethylene resin and an antioxidant. The antioxidant is a thioester, a hindered amine light stabilizer or 1,3,5-trimethyl-2,4,6-tris (3,5-di-tert-butyl-4-hydroxybenzyl) benzene.

BRIEF DESCRIPTION OF THE DRAWINGS

The present disclosure may be understood from the following detailed description when read with the accompanying figures.

DETAILED DESCRIPTION

Introduction and Definitions

Figure 1:
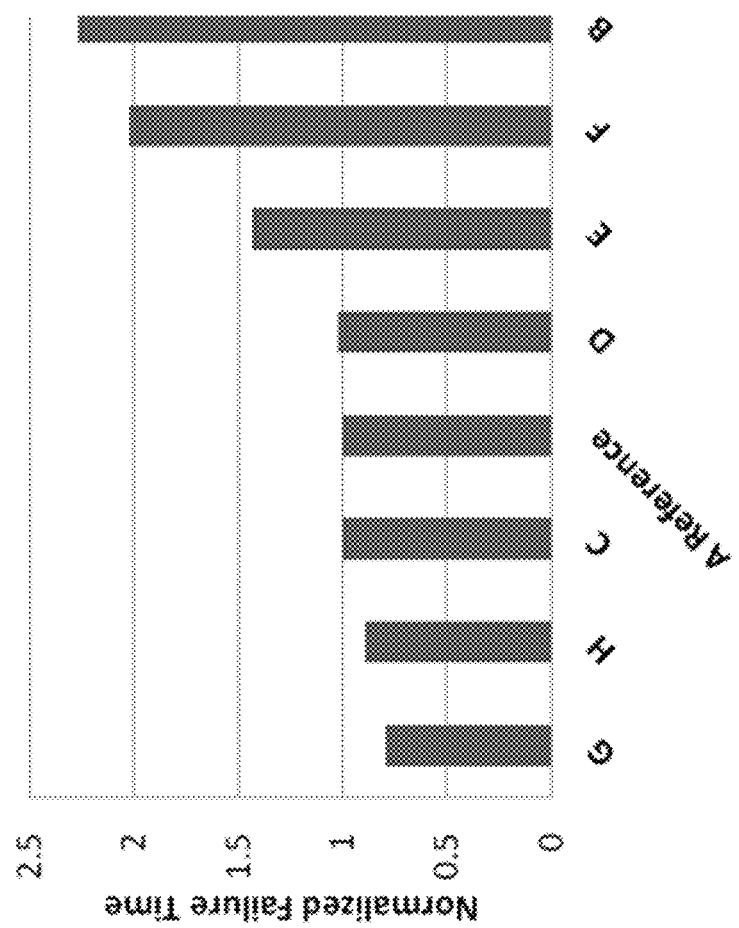
FIG. 1 depicts normalized failure time of ½" tubing as described in Example 1.

The following disclosure includes specific embodiments, versions and examples, but the disclosure is not limited to these embodiments, versions or examples, which are included to enable a person having ordinary skill in the art to make and use embodiments when the information in this disclosure is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

The term "activity" refers to the weight of product produced per weight of the catalyst used in a process per hour of reaction at a standard set of conditions (e.g., grams product/gram catalyst/hr).

The term "substituted" refers to an atom, radical or group that replaces a hydrogen in a chemical compound.

The term "blend" refers to a mixture of compounds that are blended and/or mixed prior to contact with another compound.

As used herein, "density" and "specific gravity" are measured via ASTM-D-792.

As used herein, "melt flow index" is measured via ASTM-D-1238-01 (Method A—Cut and Weigh).

As used herein, "Environmental Stress Crack Resistance (ESCR) for resin" is measured via ASTM-D-1693, Condition B.

As used herein, "Polyethylene Notch Tensile (PENT) Test" is measured via ASTM-F-1473.

As used herein, "Tensile Strength, Yield" is measured via ASTM-D-638.

As used herein, "Elongation at Break" is measured via ASTM-D-638.

As used herein, "Izod Impact, Notched" is measured via ASTM-D-256.

As used herein, "flexural modulus" is measured via ASTM-D-790, and may be referred to as "stiffness".

The term "equivalent" refers to a molar ratio of two components.

As used herein, "molecular weight distribution" is the ratio of the weight average molecular weight to the number average molecular weight (Mw/Mn) of a polymer.

As used herein, "room temperature" includes a temperature of from about 20° C. to about 28° C. (68° F. to 82° F.) However, room temperature measurements generally do not include close monitoring of the temperature of the process and therefore such a recitation does not intend to bind the embodiments described herein to any predetermined temperature range. Furthermore, a temperature difference of a few degrees does not matter to the phenomenon under investigation, such as a preparation method.

As used herein, "bimodal" refers to a polymerization process for producing a bimodal resin having a distinct low molecular weight portion and a distinct high molecular weight portion.

As used herein, "copolymer" refers to any polymeric material comprising two or more different monomers.

As used herein, "water" refers to aqueous solutions, including, but not limited to, potable water, wastewater, and other solutions including a water component.

Concentrations of disinfectants such as chlorine dioxide, chlorine, chloramines, hypochlorites, and mixtures thereof may range from about 0.01 mgl/L to about 4 mgl/L chlorine content or from 0.1 mg/L to about 4 mg/L in water, although these concentrations are not limiting. In certain embodiments, different disinfectants may be injected into water at different times.

Catalyst Systems

In embodiments of the present disclosure, the articles of the present disclosure are prepared from a bi- or multi-modal polyethylene resin. These bi- and multi-modal polyethylene resins may be manufactured by two or more catalyst systems in a single reactor or by a single catalyst system in two or more serially connected reactors.

The polyethylene resins may be manufactured using Ziegler-Natta and/or metallocene catalyst systems.

Metallocene Catalyst Systems

In certain embodiments, when the one or more catalyst systems are metallocene catalyst systems, they include a bridged bis-indenyl or bistetrahydro-indenyl catalyst component described by general formula:

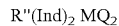

$R''(Ind)_2 MQ_2$ wherein Ind is a substituted or unsubstituted indenyl or tetrahydroindenyl group, R" is a structural bridge imparting stereorigidity to the complex, M is a metal Group 4 of the Periodic Table and Q is a hydrocarbyl having from 1 to 20 carbon atom or a halogen. The process of manufacturing polyethylene resins in accordance with these embodiments may be found, in non-limiting examples, in U.S. Pat. Nos. 8,459,283, 8,528,580, and 8,627,840, which are incorporated herein fully by reference.

If Ind is an indenyl group, the indenyl group may be unsubstituted, or the indenyl group may be substituted at position 4 with a bulky substituent and at position 2 with a small substituent. A bulky substituent is at least as bulky as a t-butyl group. A small substituent may be, but is not limited to a methyl group.

If Ind is a tetrahydroindenyl group, in some embodiments it may be unsubstituted.

In some embodiments, M may be Ti or Zr.

In some embodiments, Q is selected from aryl, alkyl, alkenyl, alkylaryl or arylalkyl groups having at most 6 carbon atoms, or a halogen. In certain embodiments, both Qs are the same and are chlorine.

In some embodiments, bridge R" may be a $C_1$-$C_4$ alkylene radical, a dialkyl germanium or silicon or siloxane, or an alkyl phosphine or amine radical, wherein the bridge is substituted or unsubstituted. In certain embodiments, bridge R" is ethylene, isopropylidene, dimethylsilyl or diphenyl.

In one embodiment, the catalyst component is ethylene bistetrahydroindenyl zirconium dichloride. The metallocene catalyst component used in the present disclosure may be prepared by any known method, including, but not limited to, the preparation method as described in J. Organomet. Chem. 288., 63-67 (1985) (incorporated herein by reference).

The catalyst system may include an activating agent having an ionizing action and may include an inert support. In certain embodiments, the activating agent is an aluminoxane or boron-containing compound. The inert support may be a mineral oxide, such as silica. The activating agent may be a fluorinated activating support.

The polyethylene resins of the present disclosure may be prepared by any method suitable therefore. In certain embodiments, the polyethylene resins are prepared by physically blending the high density and the low density polyethylene fractions, prepared separately, or prepared by polymerizing ethylene in the presence of a mixture of catalysts. In some embodiments, the high density and low density fractions are produced in two serially connected loop reactors with the same catalyst system. In such a case, the low molecular weight (LMW), high density fraction may be prepared in the first reactor, so that the high molecular weight (BMW), low density fraction is prepared in the presence of the high density fraction. In certain embodiments, the same catalyst system is used in both steps of the cascade polymerization process to produce a chemical blend of the high and low molecular weight fractions. The catalyst system may be employed in a solution polymerization process, which is homogeneous, or in a slurry process, which is heterogeneous, or in a gas phase process. In some embodiments, the polymerization process is carried out in two serially connected slurry loop reactors.

In certain embodiments of the present disclosure, co-reactants may be used, such as hydrogen or comonomers. For instance, in some embodiments, the first co-reactant is hydrogen to produce the low molecular weight fraction, and the second co-reactant is the comonomer to produce the lower density fraction. Comonomers may include hexene, butene, octene or methylpentene.

In another embodiment, the first co-reactant is the comonomer. Because some metallocene catalyst components of the present disclosure exhibit good comonomer response as well as good hydrogen response, substantially all of the comonomer may be consumed in the first reaction zone. Homopolymerization may take place in the second reaction zone with little or no interference from the comonomer.

The temperature of each reactor may be in the range of from 60° C. to 110° C. or from 70° C. to 90° C.

Metallocene-Catalyzed Polyethylene

In certain embodiments, the polyethylene resin is a bi- or multi-modal resin. The polyethylene resin may include a UMW, low density fraction and a LMW, high density fraction.

The high molecular weight, low density fraction may have a density of at least 0.908 g/cm³, at least 0.912 g/cm³ and at most 0.928 g/cm³, or at most 0.926 g/cm³. In certain embodiments, the high molecular weight, low density fraction has a density between 0.922 g/cm³ and 0.926 g/cm³. The high molecular weight, low density fraction may have a high load melt index (HLMI, 21.6 kg @ 190° C.) of at least 2 dg/min, at least 5 dg/min or at least 7 dg/min and of at most 12 dg/min, of at most 10 dg/min. In certain embodiments, the HLMI is from 8 to 9 dg/min. The melt index MI2 may be from 0.05 to 2 dg/min, from 0.1 to 0.5 dg/min or about 0.2 dg/min. As used herein, HLMI is measured in accordance with ASTM-D-1238, under a load of 21.6 kg and at a temperature of 190° C. As used herein, MI2 is measured in accordance with ASTM-D-1238, under a load of 2.16 kg and at a temperature of 190° C.

The low molecular weight, high density fraction may have a density of at least 0.930 g/cm³ or at least 0.940 g/cm³ and at most 0.975 g/cm³ or at most 0.962 g/cm³. In certain embodiments, the low molecular weight, high density fraction is between about 0.945 and 0.955 g/cm³. The low molecular weight, high density fraction may have a melt index MI2 of at least 0.5 dg/min or at least 1 dg/min and of at most 10 dg/min or of at most 6 dg/min. In certain embodiments, the low molecular weight, high density fraction may have a melt index MI2 of from about 2 to about 3 dg/min.

The final resin may include 50 to 60 wt % of the HMW fraction, from 50 to 55 wt %, of the UMW fraction, or from 52 to 53 wt % of the HMW fraction. The final resin may include from 40 to 50 wt % of LMW fraction, from 45 to 50 wt % of LMW fraction, or from 47 to 48 wt % of LMW fraction. The final resin may have a broad or multimodal molecular weight distribution of from 2 to 5, a density of from 0.930 to 0.949 g/cm$^3$ and a melt index MI2 of from 0.3 to 1 dg/min. In one embodiment, the final polyethylene resin has a density of about 0.935 g/cm$^3$, a melt index MI2 of about 0.6 dg/min and a polydispersity of about 3.

Ziegler Natta Catalyst Systems

Ziegler-Natta catalyst systems may be formed from the combination of a metal component (e.g., a catalyst precursor) with one or more additional components, such as a catalyst support, a cocatalyst and/or one or more electron donors.

Certain embodiments of the present disclosure are directed to a Ziegler-Natta catalyst that includes a metal component generally represented by the formula:

$$MR^4_x;$$

wherein M is a transition metal, R$^4$ is a halogen, an alkoxy or a hydrocarboxyl group and x is the valence of the transition metal. For example, x may be from 1 to 4. An example of this embodiment is described in U.S. Pat. No. 8,110,644, which is incorporated fully by reference.

The transition metal may be selected from Groups IV through VIB (e.g., titanium, vanadium or chromium), for example. R$^4$ may be selected from chlorine, bromine, carbonates, esters, or alkoxy groups in one embodiment. Non-limiting examples of catalyst components include TiCl$_4$, TiBr$_4$, Ti(OC$_2$H$_5$)$_3$Cl, Ti(OC$_3$H$_7$)$_2$Cl$_2$, Ti(OC$_6$H$_{13}$)$_2$Cl$_2$, Ti(OC$_2$H$_5$)$_2$Br$_2$ and Ti(OC$_{12}$H$_{25}$)Cl$_3$, for example.

A catalyst may be "activated" before it is useful for promoting polymerization. Activation may be accomplished by contacting the catalyst with a Ziegler-Natta activator (Z-N activator), which is also referred to in some instances as a "cocatalyst." Non-limiting examples of such Z-N activators include organoaluminum compounds, such as trimethyl aluminum (TMA), triethyl aluminum (TEAl), tri-n-octylaluminum (TNOAl), and triisobutyl aluminum (TIBAl), for example.

The components of the Ziegler-Natta catalyst system (e.g., catalyst, activator and/or electron donors) may or may not be associated with a support, either in combination with each other or separate from one another. The Ziegler-Natta support materials may include a magnesium dihalide, such as magnesium dichloride or magnesium dibromide, or silica, for example.

Prior efforts to form the Ziegler-Natta catalyst generally included the methods described below. (See, U.S. Pat. Nos. 6,734,134 and 6,174,971, which are incorporated fully by reference herein.)

A representative, non-limiting, illustration of a reaction scheme used in certain embodiments may be illustrated as:
1) MgR$^1$R$^2$+2 R$^3$OH→Mg(OR$^3$)$_2$
2) Mg(OR$^3$)$_2$+ClA(O$_x$R$^4$)$_y$→"A"
3) "A"+TiCl$_4$/Ti(OR$^5$)$_4$→"B"
4) "B"+TiCl$_4$→"C"
5) "C"+TiCl$_4$→"D"
6) "D"+AR$^6$$_3$→Catalyst While the primary reaction components are illustrated above, additional components may be reaction products or used in such reactions and not illustrated above. Further, while described herein in terms of primary reaction steps, additional steps may be included in the reaction schemes and processes described herein (e.g., washing, filtering, drying or decanting steps). It is further contemplated that other steps may be eliminated in certain embodiments. In addition, it is contemplated that any of the agents described herein may be added in combination with one another. For example, the third and fourth agents may be added to reaction product B at the same time to form reaction product D.

In some embodiments, the alkyl magnesium compound is contacted with an alcohol to form a magnesium dialkoxide compound. This reaction may occur at a reaction temperature ranging from room temperature to about 90° C. for a time of up to about 10 hours, for example.

The alcohol may be added to the alkyl magnesium compound in an equivalent of from about 0.5 to about 6 or from about 1 to about 3, for example.

The alkyl magnesium compound may be represented by the following formula:

$$MgR^1R^2;$$

wherein R$^1$ and R$^2$ are independently selected from C$_1$ to C$_{10}$ alkyl groups. Non-limiting illustrations of alkyl magnesium compounds include butyl ethyl magnesium (BEM), diethyl magnesium, dipropyl magnesium, and dibutyl magnesium, for example.

The alcohol may be represented by the formula:

$$R^3OH;$$

wherein R$^3$ is selected from C$_2$ to C$_{20}$ alkyl groups. Non-limiting illustrations of alcohols generally include butanol, isobutanol and 2-ethylhexanol, for example.

The method further includes contacting the magnesium dialkoxide compound with a first agent, or halogenating agent, to form reaction product "A." This reaction may occur in the presence of an inert solvent. A variety of hydrocarbons can be used as the inert solvent, but any hydrocarbon selected should remain in liquid form at all relevant reaction temperatures and the ingredients used to form the supported catalyst composition should be at least partially soluble in the hydrocarbon. Accordingly, the hydrocarbon is considered to be a solvent herein, even though in certain embodiments the ingredients are only partially soluble in the hydrocarbon.

Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof, for example.

The reaction described in step 2) may occur at a temperature of from about 0° C. to about 100° C. or from about 20° C. to about 90° C. for a time of from about 0.2 hours to about 24 hours or from about 1 hour to about 4 hours, for example.

Non-limiting examples of the first agent are generally represented by the following formula:

$$ClA(O_xR^4)_y;$$

wherein A is selected from titanium, silicon, aluminum, carbon, tin and germanium, R$^4$ is selected from C$_1$ to C$_{10}$ alkyls, such as methyl, ethyl, propyl and isopropyl, x is 0 or 1 and y is the valence of A minus 1. Non-limiting illustrations of first agents include chlorotitaniumtriisopropoxide (ClTi(O$^i$Pr$_3$) and ClSi(Me)$_3$, for example.

The method further includes contacting reaction product "A" with a second agent, or halogenating/titanating agent to form reaction product "B." This reaction may occur in the presence of an inert solvent. The inert solvents may include any of those solvents previously discussed herein, for example.

The reaction of step 3) may further occur at a temperature of from about 0° C. to about 100° C. or from about 20° C. to about 90° C. for a time of from about 0.2 hours to about 36 hours or from about 1 hour to about 4 hours, for example.

The second agent may be added to reaction product "A" in an equivalent of from about 0.5 to about 5, or from about 1 to about 4 or from about 1.5 to about 2.5, for example.

The second agent may be represented by the following formula:

$$TiCl_4/Ti(OR^5)_4;$$

wherein $R^5$ is selected from $C_2$ to $C_{20}$ alkyl groups. Non-limiting illustrations of second agents include blends of titanium chloride and titanium alkoxides, such as $TiCl_4/Ti(OBu)_4$. The blends may have an equivalent of $TiCl_4:Ti(OR^5)_4$ of from about 0.5 to about 6 or from about 2 to about 3, for example.

The method may then include contacting reaction product "B" with a third agent, or halogenating/titanating agent to form reaction product "C." This reaction may occur in the presence of an inert solvent. The inert solvents may include any of those solvents previously discussed herein, for example. The reaction may further occur at room temperature, for example.

The third agent may be added to the reaction product "B" in an equivalent of from about 0.1 to about 5, or from about 0.25 to about 4 or from about 0.45 to about 4.5, for example.

Non-limiting illustrations of third agents include metal halides. The metal halides may include any metal halide known to one skilled in the art, such as titanium tetrachloride ($TiCl_4$), for example. The third agent may be added in a equivalent of from about 0.1 to about 5, or from about 0.25 to about 4 or from about 0.45 to about 4.5, for example.

The method may further include contacting reaction product "C" with a fourth agent, or halogenating/titanating agent, to form reaction product "D." This reaction may occur in the presence of an inert solvent. The inert solvents may include any of those solvents previously discussed herein, for example. The reaction may further occur at room temperature, for example.

The fourth agent may be added to the reaction product "C" in an equivalent of from about 0.1 to about 5, or from about 0.25 to about 4 or from about 0.45 to about 4.5, for example.

Non-limiting illustrations of fourth agents include metal halides. The metal halides may include any metal halide previously described herein.

The method may then include contacting reaction product "D" with a fifth agent to form the catalyst component. The fifth agent may be added to the reaction product "D" in an equivalent of from about 0.1 to about 2 or from 0.5 to about 1.2, for example.

Non-limiting illustrations of fifth agents include organoaluminum compounds. The organoaluminum compounds may include aluminum alkyls having the following formula:

$$AlR^6_3;$$

wherein $R^6$ is a $C_1$ to $C_{10}$ alkyl compound. Non-limiting illustrations of the aluminum alkyl compounds generally include trimethyl aluminum (TMA), triisobutyl aluminum (TIBAl), triethyl aluminum (TEAl), tri-n-octylaluminum (TNOAl), n-octyl aluminum and n-hexyl aluminum, for example.

As illustrated above, the first agent and the second agent generally include blends of compounds. In addition, a plurality of first agents or second agents may be used and still retain one or more of the beneficial properties obtained via blends. Further, a magnesium metal may be used in place of the alkyl magnesium compounds. (See for example U.S. patent application Ser. No. 11/474,145, filed 23 Jun., 2006, entitled Formation of Ziegler-Natta Catalyst, which is fully incorporated by reference herein).

In another embodiment, magnesium ethoxide $(Mg(OEt)_2)$, may be used as a starting material to obtain a Ziegler-Natta catalyst. A representative, non-limiting, illustration of a reaction scheme used in certain embodiments may be illustrated as:

A  $Mg(OEt)_2+TiCl\rightarrow$solid "A"
B  Solid "A"$\rightarrow$"ZN Catalyst"
C  "ZN Catalyst"+TEAl$\rightarrow$Activated Catalyst
D  Activated catalyst+ethylene$\rightarrow$Pre-polymerized catalyst.

In this embodiment, in step A, the magnesium ethoxide is chlorinated, as an example, such as through the use of titanium chloride. The resulting product, term solid "A" may optionally be washed by a solvent, such as hexane. After the optional washing step, in step B, solid "A" may be heated to a temperature above 100° C. form the "ZN Catalyst." In step C, the "ZN Catalyst" may be mixed with an organoaluminum compound. Organoaluminum compounds may include aluminum alkyls having the following formula:

$$AlR^6_3;$$

wherein $R^6$ is a $C_1$ to $C_{10}$ alkyl compound. Non-limiting illustrations of the aluminum alkyl compounds generally include trimethyl aluminum (TMA), triisobutyl aluminum (TIBAl), triethyl aluminum (TEAl), tri-n-octylaluminum (TNOAl), n-octyl aluminum and n-hexyl aluminum, or combinations thereof, for example. In this non-limiting example, the organoaluminum compound is TEAl. Following of the "white catalyst" with TEAl, the mixture is heated to form an activated catalyst. In certain embodiments, this activated catalyst may be pre-polymerized with an olefin, such as, for example, ethylene, to form a pre-polymerized catalyst in step D.

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. Nos. 5,525, 678; 6,420,580; 6,380,328; 6,359,072; 6,346,586; 6,340, 730; 6,339,134; 6,300,436; 6,274,684; 6,271,323; 6,248, 845; 6,245,868; 6,245,705; 6,242,545; 6,211,105; 6,207, 606; 6,180,735 and 6,147,173, which are incorporated fully by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. Nos. 4,271,060, 5,001,205, 5,236,998 and 5,589,555, which are incorporated fully by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375 and 5,668,228, which are incorporated fully by reference herein.)

Slurry phase processes generally include forming a suspension of solid, particulate polymer in a liquid polymerization medium, to which monomers and optionally hydrogen, along with catalyst and optionally a co-catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In one embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double-jacketed pipe.

In one embodiment, a slurry process using continuous stirred tank reactors, such as the Hoechst process (see Kirk-Othmer, Encyclopedia of Chemical Technology, Volume 17, $4^{th}$ Edition, pages 735-737 (1996), which is herein incorporated by reference), may be carried out. Hexane is used as the diluent. The reactors may be operated at 75° C. to 95° C. and a total pressure of 1 atm to 12.5 atm. Ethylene comonomer, solvent, catalyst components, and hydrogen are continuously fed into the reactor. Residence time of the catalyst is from 1 to 6 hours. Optionally, hydrogen may be added to the process, such as for molecular weight control of the resultant polymer. Optionally, other monomers, such as butene, may also be added to the process.

In an embodiment, ethylene may be polymerized in the presence of a Ziegler-Natta catalyst at elevated temperature and pressure. Polymerization is carried out in a series of polymerization reactors selected from the group of slurry reactors. In one embodiment, the reactor system includes at least two continuously stirred tank reactors (CSTR). The reactor system can include the reactors in any number and order, and it is also possible to conduct the process in single or multiple loop reactors.

Where the second polyolefin is produced in the presence of the first polyolefin, a multimodal or at least bimodal molecular weight distribution may be obtained.

Additionally, there may be included with the polymerization reactors, prereactors, which include any reactor for prepolymerizing the catalyst and for modifying the olefinic feed, if necessary. All reactors may be arranged in series.

The high molecular weight portion and the low or medium molecular weight portion of the resulting bimodal polymer, can be prepared in any order in the reactors, i.e., the low molecular weight portion in the first reactor and the high molecular weight portion in the second reactor, or vice versa. The conditions of the reactor are selected such that 30 wt % to 70 wt %, or 40 wt % to 60 wt %, or 50 wt % of the final product is made in one reactor, with the remaining portion product being formed in the second reactor.

Alternatively, other types of polymerization processes may be used, such stirred reactors in series, parallel or combinations thereof, for example. Upon removal from the reactor, the polymer may be passed to a polymer recovery system for further processing, such as addition of additives and/or extrusion, for example.

Ziegler-Natta-Catalyzed Polyethylene

The improved polymers formed via the processes described herein may include, but are not limited to, linear low density polyethylene, elastomers, plastomers, high density polyethylenes, low density polyethylenes, medium density polyethylenes, bimodal polyethylenes, and polyethylene copolymers for example.

In certain embodiments, ethylene based polymers may have a density of from about 0.930 g/cc to about 0.960 g/cc, or from about 0.940 g/cc to about 0.950 g/cc, or from about 0.9465 g/cc to about 0.951 g/cc, or from 0.947 to 0.950, for example. Such ethylene based polymers may have a molecular weight distribution of from 10 to 25, or from 15 to 20, for example.

In certain embodiments, the ethylene based polymers may have a flexural modulus, or stiffness, of from 90,000 psi to 200,000 psi, or from 120,000 psi to 170,000 psi, for example. In some embodiments, the ethylene based polymers have a slow crack growth resistance as measured by PENT (Pennsylvania Notch Tensile Test) of at from at least 1200 hours to at least 12,000 hours, in a further aspect at least 2000 to 5000 hours, in an additional embodiment from at least 3000 hours to 5000 hours, and in a further aspect from at least 3000 hours to at least 8,000 hours.

The ethylene based polymers may have a melt flow index (MI 5) of from about 0.1 dg/min to about 0.5 dg/min., or from about 0.15 dg/min. to about 0.30 dg/min., for example. An example of an ethylene based polymer made in accordance with a Zeigler-Natta catalyst in an embodiment of this disclosure is XT10N, a bimodal polyethylene polymer manufactured by Total Petrochemicals and Refining USA Inc. Typical property values for XT10N are:

TABLE 1

Typical Properties of XT10N

| | |
|---|---|
| Specific Gravity | 0.949 g/cc |
| Melt Flow | 7.5 g/10 min |
| PENT | >5000 hours |
| Tensile Strength, Yield | >3500 psi |
| Elongation at Break | >800% |
| Flexural Modulus | 150 ksi |
| Izod Impact, Notched | 8.00 ft-lb/in |

Additives

In certain embodiments of the present disclosure, the polyethylene resin may include one or more additives. For instance, the polyethylene resin may include one or more of the following: a thioester, a hindered amine light stabilizer (HALS), 1,3,5-trimethyl-2,4,6-tris (3,5-di-tert-butyl-4-hydroxybenzyl) benzene (manufactured by Albemarle Corporation as Ethanox 330), a metal deactivator, or a combination thereof. In certain embodiments, the polyethylene resin includes a thioester, a HALS, or 1,3,5-trimethyl-2,4,6-tris (3,5-di-tert-butyl-4-hydroxybenzyl) benzene and a metal deactivator. Non-limiting examples of thioesters include polythiodipropionates and thiodipropionates. Non-limiting example of metal deactivators include, but are not limited to, triazoles, tolyltriazoles, a thiadiazole, or combinations thereof, as well as derivatives thereof. Specific examples of metal deactivators include derivatives of benzotriazoles, benzimidazole, 2-alkyldithiobenzimidazoles, 2-alkyldithiobenzothiazoles, 2-(N,N'-dialkyldithio-carbamoyl)benzothiazoles, 2,5-bis(alkyl-dithio)-1,3,4-thiadiazoles, 2,5-bis(N,N'-dialkyldithiocarbamoyl)-1,3,4-thiadiazoles, 2-alkyldithio-5-mercapto thiadiazoles and 2',3-bis[[3-[3,5-di-tert-butyl-4-hydroxyphenyl]propionyl]]propionohydrazide (manufactured by Ciba Inc. as MD1024). Non-limiting examples of the hindered amine light stabilizers may include poly-(N-hydroxyethyl-2,2,6,6-tetramethyl-4-hydroxy-piperidylsuccinate (Tinuvin 622 provided by Ciba Specialty Chemicals Corp.), poly(N-1,1,3,3-tetramethylbutyl-NA,NB-di(2,2,6,6-tetramethylpiperidinyl)-NA,NB-melaminoditrimethylene (Chimassorb 944 provided by Ciba Specialty Chemicals Corp.), N,N',N'',N'''-tetrakis(4,6-bis(butyl-N-methyl-2,2,6,6-tetramethylpiperidine-4-yl)amino)triazine-2-yl)-4,7-diazadecane-1,10-diamine (Chimassorb 119 provided by Ciba Specialty Chemicals Corp.), 2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, 1,2,2,6,6-pentamethyl-4-piperidylmethylmethacrylate, 2,2,6,6-tetramethyl-4-piperidylmethylmethacrylate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butanetetracarboxylate, bis(2,2,6,6-tetramethyl-4-piperidyl)bis(tridecyl)-1,2,3,4-butanetetracarboxylate, bis(1,2,2,6,6-pentamethyl-4-piperidyl)· bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidynol/diethyl succinate condensation polymerization products, 1,6-bis(2,2,6,6-tetramethyl-4-piperidylamino) hexane/dibromo ethane condensation polymerization products, 1,6-bis(2,2,6,6-tetramethyl-4-piperidylamino)hexane/2,4-dichloro-6-morpholino-s-triazine condensation polymerization products, 1,6-bis(2,2,6,6-tetramethyl-4-piperidylamino)hexane/2,4-dichloro-6-tert-octylamino-s-triazine condensation polymerization products, 1,5,8,12-tetrakis[2,4-bis(N-butyl-N-(2,2,6,6-tetramethyl-4-piperidyl)amino)-s-triazine-6-yl]-1,5,8,12-tetra-azadodecane, 1,5,8,12-tetrakis[2,4-bis(N-butyl-N-(1,2,2,6,6-pentamethyl-4-piperidyl)amino)-s-triazine-6-yl]-1,5,8,12-tetra-azadodecane, 1,6,11-tris[2,4-bis(N-butyl-N-(2,2,6,6-tetramethyl-4-piperidyl)amino)-s-triazine-6-ylamino] undecane, 1,6,11-tris[2,4-bis(N-butyl-N-(1,2,2,6,6-pentamethyl-4-piperidyl)amino)-s-triazine-6-ylamino] undecane, 3,9-bis[1,1-dimethyl-2-[tri s(2,2,6,6-tetramethyl-4-piperidyloxycarbonyloxy)butylcarbonyloxy]ethyl]-2,4,8,10-tetraoxaspiro[5,5]undecane, 3,9-bis[1,1-dimethyl-2-[tris (1,2,2,6,6-pentamethyl-4-piperidyloxycarbonyloxy) butylcarbonyloxy]ethyl]-2,4,8,10-tetraoxaspiro[5,5] undecane, $N_1$-tert. butyl-1,4-pentanediamine, $N_2$-isopropyl-4-methyl-2,4-pentanediamine, $N_1$-isopropyl-2-methyl-1,2-butanediamine, 2-ethylamino-2-methyl-4-aminopentane, N-tert. pentyl-1,4-butanediamine, N-tert. butyl-1,5-pentanediamine, $N_2$-isopropyl-2-methyl-1,2-propanediamine, N-sec. butyl-1,3-propanediamine, $N_1$-dimethyl-1,2-diamino-2-methylbutane, N-t-butyl-ethylenediamine, N-t-butyl-1,3-propanediamine, 2-methylamino-2-methyl-4-amino pentane, $N_1$-t-butyl-2-methyl-1,2-propanediamine, $N_1$-butyl-2-methyl-1,2-propanediamine, N-sec. butyl-2-methyl-1,3-propanediamine, $N_1$-propyl-2-methyl-1,2-propanediamine, $N_1$-sec. butyl-2-methyl-1,2-propanediamine, N-t-butyl-1,4-butanediamine, $N_2$-ethyl-1,2-hexanediamine, 1-methyl-1-phenyl ethylenediamine, 2-benzyl-1,2-propanediamine, 1-phenyl-1(2-amino-ethylamino)-propane, $N_1$-methyl-2-phenyl-1,2-butanediamine, $N_1$-cyclohexyl-1,2-propanediamine, 1-amino-1-(2-amino-isopropyl)-cyclohexane, 1-methylamino-1-aminomethyl-cyclopentane, 1-amino-1-aminomethylcycloheptane, N-isopropyl-1,2-diaminocyclohexane, $N_2$-cyclohexyl-1,2-butanediamine, $N_2$-cyclohexyl-1,2-propanediamine, N-cycloheptyl-ethylenediamine, $N_1$-cyclohexyl-2-methyl-1,2-propanediamine, 1-(2-aminoisopropyl)-2-amino-3-methylcyclopentane, N-isopropyl-1,4-diaminocyclohexane, $N_1$-cyclohexyl-$N_2$-methyl-ethylenediamine, N-cyclohexyl-ethylenediamine, $N_1$-cyclohexyl-N.sub.2-ethyl-ethylenediamine, $N_1$-cyclohexyl-N.sub.2-methyl-1,2-propanediamine, N-cyclohexyl-1,3-propanediamine, 1,8-p-menthanediamine, 1-amino-1-aminomethylcyclohexane, 1,3-diamino-1-methylcyclohexane, $N_2$-cyclohexyl-2-methyl-1,2-propanediamine, 2,4-diamino-2-methylpentane, 3,5-diamino-3-methylheptane, $N_1$-tert. butyl-$N_2$-isopropyl-1,3-propanediamine, $N_1$-tert. butyl-$N_2$-sec. butyl-ethylenediamine, $N_1$-tert. butyl-$N_2$-isopropyl-1,3-propanediamine, f $N_1$-tert. butyl-$N_2$-butyl-ethylenediamine, $N_1$-tert. butyl-$N_2$-isobutyl-ethylenediamine, $N_1$,$n_2$-diisopropyl-1,2-propanediamine, $N_1$-tert. butyl-$N_2$-isopropyl-ethylenediamine, $N_1$-sec. butyl-$N_2$-isopropyl-ethylenediamine, $N_1$1-tert. pentyl-$N_2$-isopropyl-ethylenediamine, $N_1$,$n_3$-diethyl-1,3-butanediamine, $N_1$-tert. butyl-$N_2$-methyl-ethylenediamine, $N_1$-(2-pentyl)-$N_2$-methyl-ethylenediamine, $N_1$-tert. butyl-$N_2$-methyl-1,4-butanediamine, $N_1$-tert. butyl-$N_2$-ethyl-1,3-propanediamine, $N_1$-tert. butyl-$N_2$,$N_2$-diethyl ethylenediamine, $N_1$-cyclohexyl-dipropylene triamine N₁,n₃,2-pentamethyl-1,2,3-triaminopropane, N₁-isopropyl-N₂-(3-aminopropyl)-2-methyl-1,2-propanediamine, 2.2-dimethyl-diethylenetriamine, N₁-tert. butyl-1,2,3-triaminopropane, 2,2,5,5-tetramethyldiethylenetriamine, 1-amino-1-aminomethyl-2-hydroxymethylcyclohexane, N-hydroxyethyl-1,2-diaminocyclohexane, N-cyclohexyl-1,3-diamino-2-propanol, N-(2-hydroxycyclohexyl)-1,3-propanediamine, N-isopropanol-1,2-diaminocyclohexane, N-(2-hydroxybutyl)-1,4-diaminocyclohexane, N₁ (1-hydroxy-2-butyl)-2-methyl-1,2-propanediamine, N(1-hydroxy-2-methyl-2-butyl)-1,3-propanediamine, N₁ (1,1-dimethyl-2-hydroxyethyl)-2-methyl-1,2-propanediamine, N₃-isobutyl-2-methyl-2,3-diamino-1-propanol, N(3-hydroxy-2-butyl)-2,3-diaminobutane, N₁-hydroxyethyl-2-methyl-1,2-propanediamine, 2,N₃,N₃-trimethyl-2,3-diamino-1-propanol, N₁,2-dimethyl-N₁-hydroxyethyl-1,2-propanediamine, N(1,1-dimethyl-2-hydroxyethyl)-1,3-propanediamine, N-tert. butyl-1,3-diamino-2-propanol, 3-amino-3-methyl-2-pentanol, 1-hydroxymethyl-cyclopentylamine, 2,3-dimethyl-3-amino-1-butanol, 2-amino-2-ethyl-1-butanol, 1-methyl-2-hydroxycyclopentylamine, 2-amino-2-methyl-3-pentanol, 2,4-dimethyl-2-amino cyclohexanol, 1-hydroxyethyl cyclohexylamine, 1-hydroxymethyl-3-methyl cyclohexylamine, 2-hydroxymethyl-1-methyl-cyclohexylamine, 2-amino-2-methyl-1-propanol, 2-amino-2-methyl-1-butanol, 3-amino-3-methyl-1-butanol, 3-amino-3-methyl-2-butanol, 2-amino-2,3-dimethyl-3-butanol, 2-amino-2,3-dimethyl-1-butanol, 1-hydroxymethylcyclohexylamine, 2(2-amino-2-methylpropoxy)-ethanol, 2-piperidine methanol, 2-piperidine ethanol, 2-(1-hydroxyethyl)-piperidine, 5-hydroxy-2-methyl piperidine, 2-methyl-3-hydroxy piperidine, 2,6-dimethyl-3-hydroxy piperidine, 2,5-dimethyl-4-hydroxy piperidine, 2-tert. butylamino-methyl-1,4-dimethyl-piperazine, 1-tert. butylamino-3,6-dimethyl-3,6-diaza-cycloheptane, and N-cyclohexyl-beta-alanine.

These additives may also be referred to as antioxidants. The additives may be mixed with the polyethylene resin (e.g., HDPE resin) to achieve a concentration of between 500 ppm and 7500 ppm, between 1000 ppm and 4000 ppm, or approximately 2000 ppm (all by weight).

In addition to antioxidants, the piping may be compounded with blue or black pigments, or carbon black, as examples. In certain embodiments, a HALS is combined with carbon black prior to extrusion. In certain embodiments, Irganox 1010 or Irganox 1076 may be added to reduce oxidation during extrusion. Compounding agents may be used, for example, other pigments, dyes, antiblocking agents, natural oil, synthetic oil and flame retardants.

Product Application

The polymers and blends thereof can be useful in applications known to one skilled in the art, such as forming operations (e.g., film, sheet, pipe and fiber extrusion and co-extrusion as well as blow molding, injection molding and rotary molding). Extruded articles may include articles adapted for use in containment and/or transport of water containing chlorine dioxide, chlorine, chloramines, or hypochlorites. For example and without limitation, extruded articles may include piping, tubing, geomembranes, pond liners, polyethylene sheets, water filters, filter housings of water filters, underdrain filter plates for use in water treatment plants, and water filter fittings, for example. Blow molded articles include tanks and drums. Fibers may be made into such articles as artificial turf.

EXAMPLES

Examples 1 and 5 were performed on pipe in accordance with ASTM-F-2063 and were tested with 4 ppm chlorine in water and at about 6.8 pH at 90° C. and 450 psi stress. Examples 2, 3 and 4 were performed on compression molded tensile bar specimens which were immersed in water or water containing a chlorinated bleach solution at 40° C.

Example 1—½" Tubing

HDPE XT10N and an antioxidant were mixed and extruded into ½" DR11 tubing in the concentrations of antioxidant shown below in Table 2 (ppm by weight). Irganox 1010 is a phenolic antioxidant manufactured by BASF (Pentaerythritol tetrakis(3-(3,5-di-tert-butyl-4-hydroxyphenyl)propionate)). Hostanox O3 is a phenolic antioxidant manufactured by Clariant (Bis[3,3-bis-(4'-hydroxy-3'-tert-butylphenyl)butanoicacid]-glycol ester).

TABLE 2

| Condition | Antioxidant |
| --- | --- |
| A | No antioxidant |
| B | 2% PolyOne 2478* |
| C | 1000 ppm Irganox 1010 |
| D | 2000 ppm Irganox 1010 |
| E | 1000 ppm Ethanox 330 |
| F | 2000 ppm Ethanox 330 |
| G | 1000 ppm Hostanox O3 |
| H | 2000 ppm Hostanox O3 |

*PolyOne 2478 is a blue concentrate with a HALS additive package. HALS are typically from 0 to 7500 ppm in the final pipe formulation.

With reference to FIG. 1, the ½" tubing samples in Table 2 were tested under accelerated conditions. Normalized failure times for each of the compound mixtures in Table 2 were determined. The results in FIG. 1 show that longer lifetimes are predicted when Ethanox 330 is used. Without being bound by theory, the chemical structure of Ethanox 330 has a backbone resistant to hydrolysis and the high molecular weight likely reduces its extraction into the aqueous phase. The pipe formulation based on PolyOne 2478 which is known to contain a HALS stabilizer for UV protection, also gave higher normalized failure time compared to the reference material. Without being bound by theory, the chemical structure of HALS has a backbone resistant to hydrolysis and the high molecular weight likely reduces its extraction into the aqueous phase.

Example 2—Compression Molded Tensile Bars

Figure 2:
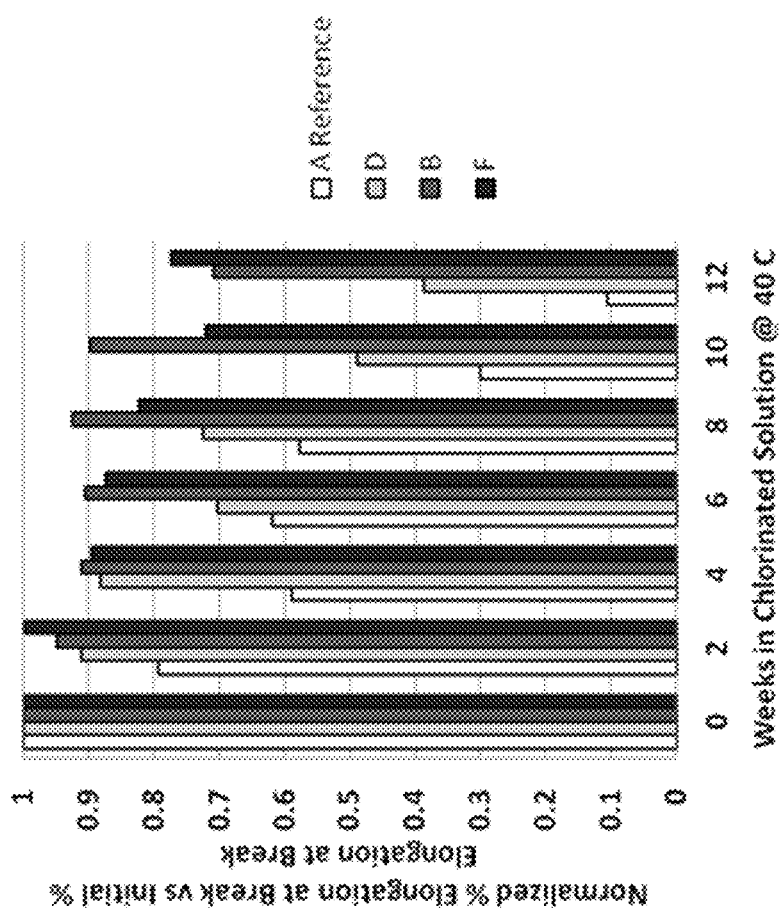
FIG. 2 depicts time in weeks versus elongation at break in percent as described in Example 2.

Compression molded tensile bars were made with the same A-F formulations defined above. The samples were immersed in a bleach solution in an oven at 40° C. and then representative samples were removed each week and elongation at break was measured. FIG. 2 shows improved resistance to loss of elongation at break with formulations F and B which are consistent with the pipe testing data.

Example 3—Compression Molded Tensile Bars

In Example 3, HDPE XT10N and Irganox 1010 were mixed to achieve an Irganox 1010 concentration of 1500 ppm and compression molded tensile bars were made. Further, HP401N, a unimodal HDPE made by Total Petrochemicals and Refining USA Inc, and Irganox 1010 were mixed to achieve an Irganox 1010 concentration of 1500 ppm and compression molded into tensile specimens. Typical property values for HDPE HP401N are:

TABLE 3

| Typical Properties of HDPE HP401N | |
|---|---|
| Specific Gravity | 0.945 g/cc |
| Melt Flow | 8.0 g/10 min |
| PENT | ~100 hours |
| Tensile Strength, Yield | ~3300 psi |
| Elongation at Break | >800% |
| Flexural Modulus | 125 ksi |
| Izod Impact, Notched | 11.00 ft-lb/in |

The compression molded samples were immersed in water with and without chlorine.

Figure 3:
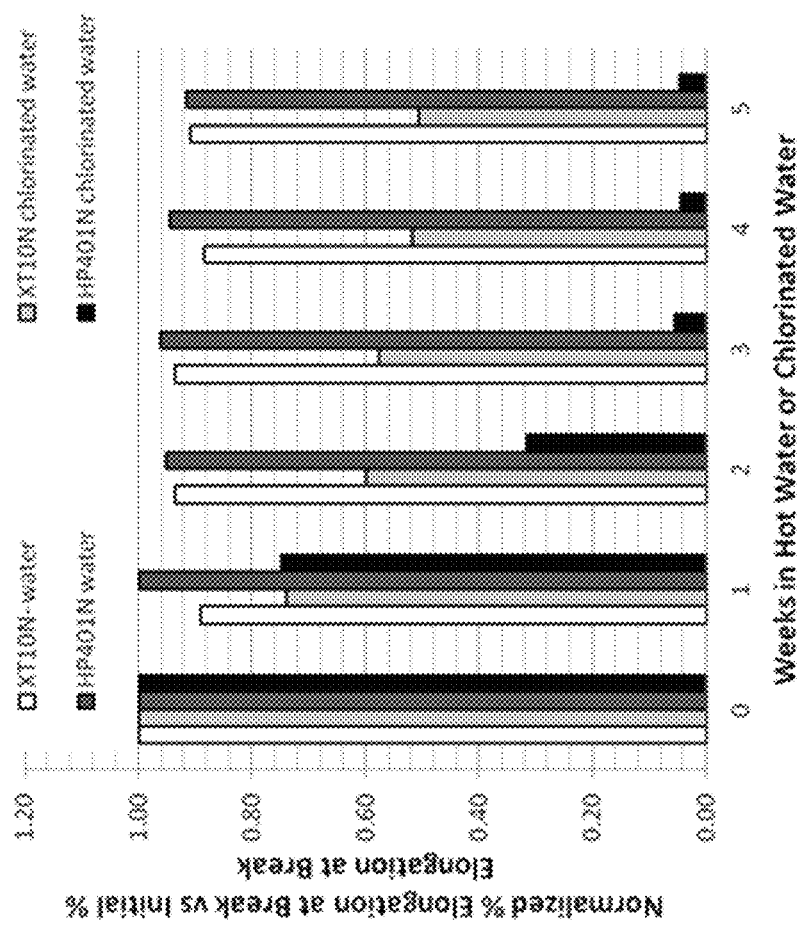
FIG. 3 depicts time in weeks versus normalized percent elongation at break compared to initial percent elongation at break as described in Example 3.

As shown in FIG. 3, % elongation of HDPE XT10N and HP401N were approximately the same with water; however, HDPE XT10N outperformed HP401N when chlorine was added to the water.

Example 4—Compression Molded Tensile Bars

Figure 4:
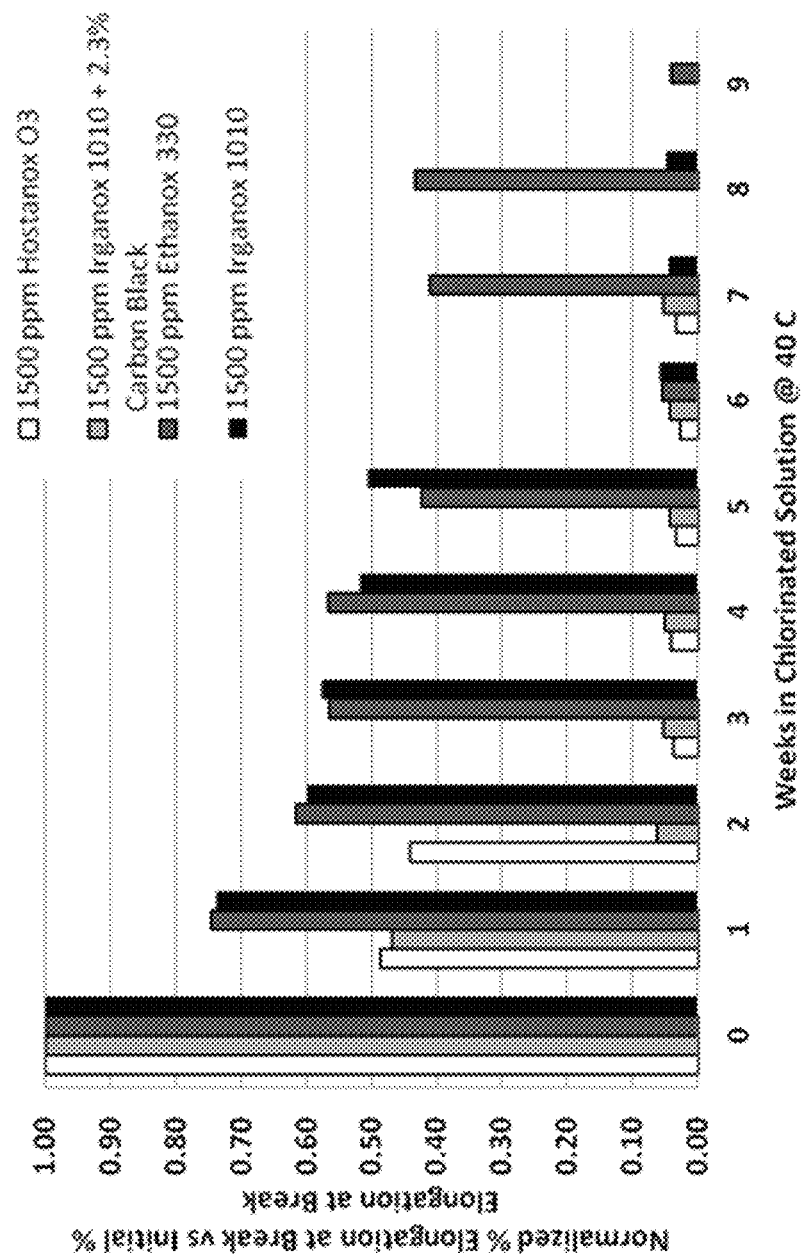
FIG. 4 depicts time in weeks versus elongation at break in percent as described in Example 4.

In Example 4, HDPE XT10N and the antioxidants shown in FIG. 4 were mixed to achieve an antioxidant concentration of 1500 ppm and compression molded tensile molded tensile bars were made. The compression molded tensile molded tensile bars were immersed in 40° C. chlorinated water, and percent elongation was tested over time. Results are shown in FIG. 4.

Example 5—4" Pipe

4" DR11 pipe using XT10N with a black concentrate. The black concentrate contained 3.07% Ethanox 330, 1.846% MD 1024, 35% carbon black and a polymer carrier (all concentrations by weight). The pipe was produced on a 90 mm, 34/1 L/D grooved feed Davis Standard extruder with two vacuum water tanks and three spray tanks. Pipe was made with a flat 395° F. temperature profile running at 828 lbs/hr, 60 rpm and 76% motor load and a head pressure of 4365 psi with the first tank with a 0.46 bar vacuum with 17° C. water temperature and the second bath with 13 inches of mercury vacuum and 72° F. The extruder was purged for 2 hours with XT10N and the black concentrate to get the line running and stable and to dial in the pipe dimensions. Pipe was produced with 6.5 wt % of the black concentrate. The concentrations of Ethanox 330 and MD1024 in the final pipe were 2000 ppm and 1250 ppm, respectively. The log average failure time of 6 pipes exceeded 7400 hrs at 90° C. and 450 psi stress. Testing was performed according to Technical Note 43 published by the Plastic Pipe Institute.

While the foregoing is directed to embodiments of the present disclosure, other and further embodiments of the disclosure may be devised without departing from the basic scope thereof and the scope thereof is determined by the claims that follow.

What is claimed is:

1. A method of transporting water containing chlorine dioxide, chlorine, chloramines, or hypochlorites through a pipe comprising:
   forming a polyethylene resin using a catalyst;
   mixing the polyethylene resin with an antioxidant, wherein the antioxidant is a hindered light amine stabilizer, thioester, or 1,3,5-trimethyl-2,4,6-tris (3,5-di-tert-butyl-4-hydroxybenzyl) benzene to form a resin/antioxidant mixture;
   adding a metal deactivator to the resin/antioxidant mixture, wherein the metal deactivator is 2-alkyldithiobenzimidazole, 2-alkyldithiobenzothiazole, 2-(N,N'-dialkyldithio-carbamoyl)benzothiazole, 2,5-bis(alkyldithio)-1,3,4-thiadiazole, 2,5-bis(N,N'-dialkyldithiocarbamoyl)-1,3,4-thiadiazole, 2-alkyldithio-5-mercapto thiadiazole or 2',3-bis[[3-[3,5-di-tert-butyl-4-hydroxyphenyl]propionyl]]propionohydrazide,
   extruding pipe from the resin/antioxidant mixture; and
   flowing water containing chlorine dioxide, chlorine, chloramines, or hypochlorites through the pipe.

2. A method of transporting water containing chlorine dioxide, chlorine, chloramines, or hypochlorites through a pipe comprising:
   forming a polyethylene resin using a catalyst;
   mixing the polyethylene resin with an antioxidant, wherein the antioxidant is a hindered light amine stabilizer, the hindered light amine stabilizer being $N_1$-tert. butyl-1,4-pentanediamine, $N_2$-isopropyl-4-methyl-2,4-pentanediamine, $N_1$-isopropyl-2-methyl-1,2-butanediamine, 2-ethylamino-2-methyl-4-aminopentane, N-tert, pentyl-1,4-butanediamine, N-tert. butyl-1,5-pentanediamine, $N_2$-isopropyl-2-methyl-1,2-propanediamine, N-sec, butyl-1,3-propanediamine, $N_1$-dimethyl-1,2-diamino-2-methylbutane, N-t-butyl-ethylenediamine, N-t-butyl-1,3-propanediamine, 2-methylamino-2-methyl-4-amino pentane, $N_1$-t-butyl-2-methyl-1,2-propanediamine, $N_1$-butyl-2-methyl-1,2-propanediamine, N-sec, butyl-2-methyl-1,3-propanediamine, $N_1$-propyl-2-methyl-1,2-propanediamine, $N_1$-sec, butyl-2-methyl-1,2-propanediamine, N-t-butyl-1,4-butanediamine, $N_2$-ethyl-1,2-hexanediamine, 1-methyl-1-phenyl ethylenediamine, 2-benzyl-1,2-propanediamine, 1-phenyl-1(2-amino-ethylamino)-propane, $N_1$-methyl-2-phenyl-1,2-butanediamine, $N_1$-cyclohexyl-1,2-propanediamine, 1-amino-1-(2-aminoisopropyl)-cyclohexane, 1-methylamino-1-aminomethyl-cyclopentane, 1-amino-1-aminomethylcycloheptane, N-isopropyl-1,2-diaminocyclohexane, $N_2$-cyclohexyl-1,2-butanediamine, $N_2$-cyclohexyl-1,2-propanediamine, N-cycloheptyl-ethylenediamine, $N_1$-cyclohexyl-2-methyl-1,2-propanediamine, 1-(2-aminoisopropyl)-2-amino-3-methylcyclopentane, N-isopropyl-1,4-diaminocyclohexane, $N_1$-cyclohexyl-$N_2$-methyl-ethylenediamine, N-cyclohexyl-ethylenediamine, $N_1$-cyclohexyl-N.sub.2-ethyl-ethylenediamine, $N_1$-cyclohexyl-N.sub.2-methyl-1,2-propanediamine, N-cyclohexyl-1,3-propanediamine, 1,8-p-menthanediamine, 1-amino-1-aminomethylcyclohexane, 1,3-diamino-1-methylcyclohexane, $N_2$-cyclohexyl-2-methyl-1,2-propanediamine, 2,4-diamino-2-methylpentane, 3,5-diamino-3-methylheptane, $N_1$-tert. butyl-$N_2$-isopropyl-1,3-propanediamine, $N_1$-tert. butyl-$N_2$-sec. butyl-ethylenediamine, $N_1$-tert. butyl-$N_2$-isopropyl-1,3-propanediamine, f $N_1$-tert. butyl-$N_2$-butyl-ethylenediamine, $N_1$-tert. butyl-$N_2$-isobutyl-ethylenediamine, $N_1,n_2$-diisopropyl-1,2-propanediamine, $N_1$-tert. butyl-$N_2$-isopropyl-ethylenediamine, $N_1$-sec. butyl-$N_2$-isopropyl-ethylenediamine, $N_1$1-tert. pentyl-$N_2$-isopropyl-ethylenediamine, $N_1,n_3$-diethyl-1,3-butanediamine, $N_1$-tert. butyl-$N_2$-methyl-ethylenediamine, $N_1$-(2-pentyl)-$N_2$-methyl-ethylenediamine, $N_1$-tert. butyl-$N_2$-methyl-1,4-butanediamine, $N_1$-tert. butyl-$N_2$-ethyl-1,3-propanediamine, $N_1$-tert. butyl-$N_2$, $N_2$-diethyl ethylenediamine, $N_1$-cyclohexyl-dipropylene triamine $N_1,n_3$, 2-pentamethyl-1,2,3-triaminopropane, $N_1$-isopropyl-$N_2$-(3-aminopropyl)-2-methyl-1,2-propanediamine, 2,2-dimethyl-diethylenetriamine, N$_1$-tert. butyl-1,2,3-triaminopropane, 2,2,5,5-tetramethyldiethylenetriamine, 1-amino-1-aminomethyl-2-hydroxymethylcyclohexane, N-hydroxyethyl-1,2-diaminocyclohexane, N-cyclohexyl-1,3-diamino-2-propanol, N-(2-hydroxycyclohexyl)-1,3-propanediamine, N-isopropanol-1,2-diaminocyclohexane, N-(2-hydroxybutyl)-1,4-diaminocyclohexane, N$_1$ (1-hydroxy-2-butyl)-2-methyl-1,2-propanediamine, N(1-hydroxy-2-methyl-2-butyl)-1,3-propanediamine, N$_1$ (1,1-dimethyl-2-hydroxyethyl)-2-methyl-1,2-propanediamine, N$_3$-isobutyl-2-methyl-2,3-diamino-1-propanol, N(3-hydroxy-2-butyl)-2,3-diaminobutane, N$_1$-hydroxyethyl-2-methyl-1,2-propanediamine, 2,N$_3$,N$_3$-trimethyl-2,3-diamino-1-propanol, N$_1$,2-dimethyl-N$_1$-hydroxyethyl-1,2-propanediamine, N(1,1-dimethyl-2-hydroxyethyl)-1,3-propanediamine, N-tert. butyl-1,3-diamino-2-propanol, 3-amino-3-methyl-2-pentanol, 1-hydroxymethyl-cyclopentylamine, 2,3-dimethyl-3-amino-1-butanol, 2-amino-2-ethyl-1-butanol, 1-methyl-2-hydroxycyclopentylamine, 2-amino-2-methyl-3-pentanol, 2,4-dimethyl-2-amino cyclohexanol, 1-hydroxyethyl cyclohexylamine, 1-hydroxymethyl-3-methyl cyclohexylamine, 2-hydroxymethyl-1-methyl-cyclohexyl amine, 2-amino-2-methyl-1-propanol, 2-amino-2-methyl-1-butanol, 3-amino-3-methyl-1-butanol, 3-amino-3-methyl-2-butanol, 2-amino-2,3-dimethyl-3-butanol, 2-amino-2,3-dimethyl-1-butanol, 1-hydroxymethyl cyclohexyl amine, or 2(2-amino-2-methylpropoxy)-ethanol, to form a resin/antioxidant mixture;

adding a metal deactivator to the resin/antioxidant mixture;

extruding pipe from the resin/antioxidant mixture; and flowing water containing chlorine dioxide, chlorine, chloramines, or hypochlorites through the pipe.

* * * * *

UNITED STATES PATENT AND TRADEMARK OFFICE
CERTIFICATE OF CORRECTION

PATENT NO. : 10,584,823 B2  
APPLICATION NO. : 15/315744  
DATED : March 10, 2020  
INVENTOR(S) : William J Gauthier et al.

Page 1 of 1

It is certified that error appears in the above-identified patent and that said Letters Patent is hereby corrected as shown below:

On the Title Page

Item (73) Assignee, "FINA TECHNOLOGY, INC., Houston, TX (US)" should be TOTAL AMERICAN SERVICES, INC., Houston, TX (US)

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*